(12) United States Patent
Sugiura et al.

(10) Patent No.: US 7,345,748 B2
(45) Date of Patent: Mar. 18, 2008

(54) SURVEY SYSTEM CAPABLE OF REMOTELY CONTROLLING A SURVEYING INSTRUMENT

(75) Inventors: Akinobu Sugiura, Ashigarakami-gun (JP); Minoru Chiba, Ashigarakami-gun (JP); Masaru Muraki, Ashigarakami-gun (JP); Masataka Kawakami, Ashigarakami-gun (JP)

(73) Assignee: Sokkia Co. Ltd., Atsugi-shi (JP)

( * ) Notice: Subject to any disclaimer, the term of this patent is extended or adjusted under 35 U.S.C. 154(b) by 222 days.

(21) Appl. No.: 11/128,182

(22) Filed: May 13, 2005

(65) Prior Publication Data
US 2005/0254044 A1 Nov. 17, 2005

(30) Foreign Application Priority Data
May 14, 2004 (JP) ............................. 2004-144899

(51) Int. Cl.
*G01B 11/26* (2006.01)
(52) U.S. Cl. ........................... 356/139.04; 356/139.05; 356/139.1; 356/141.1; 250/559.3; 33/286
(58) Field of Classification Search .............. 356/141.1
See application file for complete search history.

(56) References Cited
U.S. PATENT DOCUMENTS 5,098,185 A * 3/1992 Watanabe et al. .......... 356/4.01
5,313,409 A * 5/1994 Wiklund et al. ........... 356/4.01
5,751,408 A * 5/1998 Ohtomo et al. ............ 356/5.14
6,023,326 A * 2/2000 Katayama et al. ....... 356/141.3

FOREIGN PATENT DOCUMENTS

JP 3075384 6/2000
JP 2003-273471 9/2003

* cited by examiner

*Primary Examiner*—Thomas H. Tarcza
*Assistant Examiner*—Tim Brainard
(74) *Attorney, Agent, or Firm*—Westerman, Hattori, Daniels & Adrian, LLP.

(57) ABSTRACT

In a survey system in which guide light is emitted from the side of a target, and, on the side of a surveying instrument, a telescope is directed roughly toward the target by receiving the guide light so as to shorten the time required for automatic collimation, the automatic collimation of the surveying instrument can be reliably performed by removing guide light reflected by reflective objects such as windowpanes. The target has a guide light remitter that emits guide light The guide light transmitter includes a light source, a polarizing plate that changes light emitted from this light source into linearly polarized light, and a quarter-wave plate that changes this nearly polarized light into circularly polarized guide light The surveying instrument includes a direction detector and a collimation preparing means. The direction detector includes a quarter-wave plate and a polarizing plate.

4 Claims, 6 Drawing Sheets

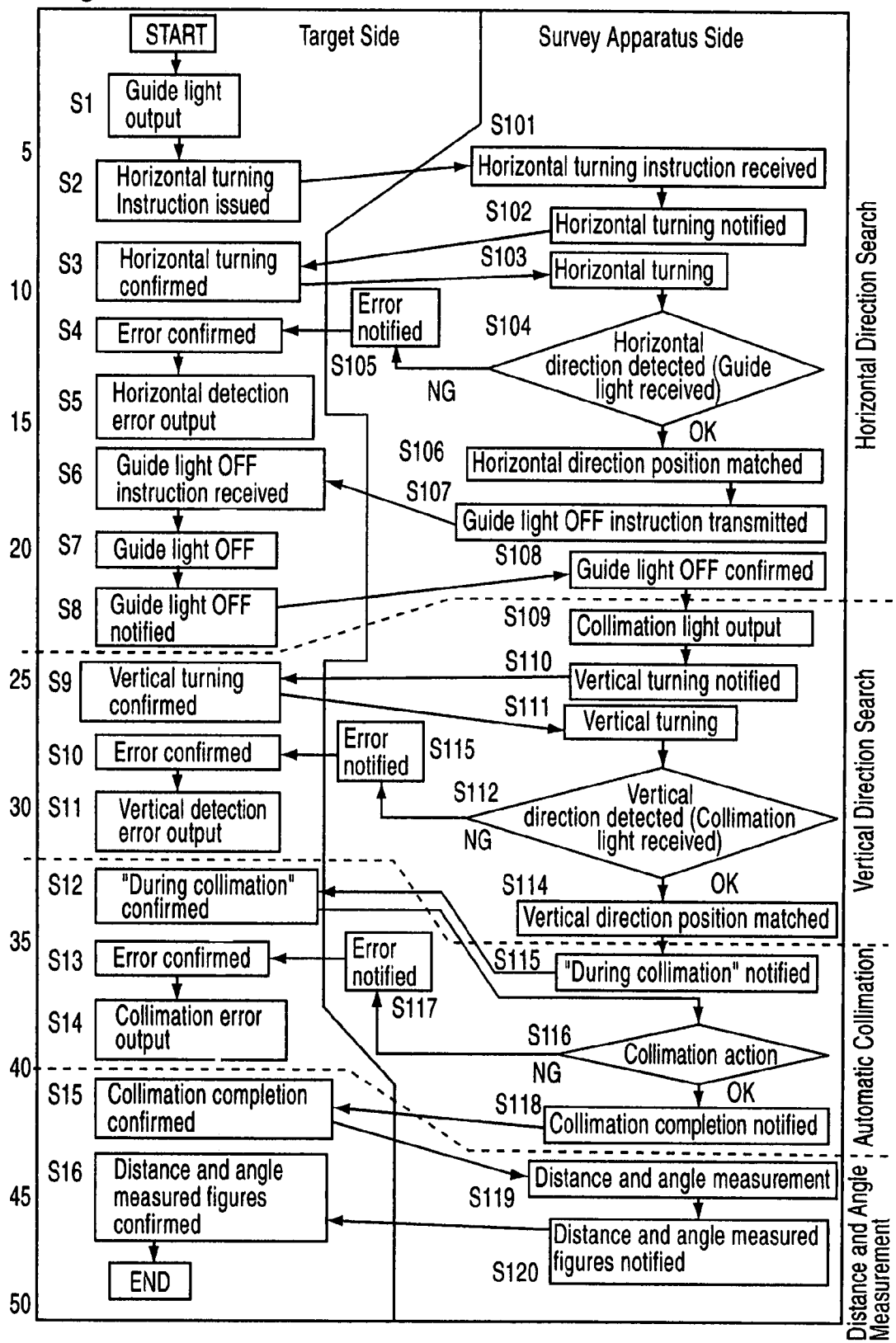

SURVEY SYSTEM CAPABLE OF REMOTELY CONTROLLING A SURVEYING INSTRUMENT

FIELD OF THE INVENTION

This invention relates to a survey system capable of remotely controlling a surveying instrument from the side of a target by a single person.

BACKGROUND OF THE INVENTION

A target placed at a survey point has been required to be collimated, in order to measure the position of the survey point or the like by means of a surveying instrument such as a conventional total station (electronic distance/angle meter) In recent years, in order to lighten labor required to collimate a target and in order to reduce collimation errors produced by habits of an operator, a surveying instrument provided with an automatic collimation device has appeared on the market The automatic collimation device is structured to emit collimation light along a collimation axis (optical axis) of a telescope of a surveying instrument, then calculate the direction of a target by receiving collimation light reflected from the target, and automatically direct the telescope toward the target. The surveying instrument provided with the thus structured automatic collimation device has come to include a remote controller so that a survey can be performed even by a single operator from a place apart from the main body of the surveying instrument.

However, if the surveying instrument provided with the automatic collimation device is operated under a command issued from the remote controller during a survey, a scanning operation must be performed with the telescope in a wide range in order to catch the target within the narrow visual field of the telescope. Therefore, disadvantageously, much time is consumed for automatic collimation, and the survey cannot be smoothly performed.

To solve this problem, a surveying instrument disclosed in Japanese Patent No. 3075384 is known. The surveying instrument disclosed in this document is shown in FIG. 6 and FIG. 7.

In the surveying instrument 11, light receiving units 25 and 26 for receiving signal light from the remote controller 27 are provided on the front and the back thereof, respectively. This signal light functions also as guide light used to show the position of the remote controller 27'. Each of the light receiving units 25 and 26 is shaped like a pyramid, and has four light receiving surfaces A, B, C, and D as shown in FIG. 7.

When an operator in the vicinity of a reflecting prism (e.g, corner-cube prism) 23 directs the remote controller 27 toward the surveying instrument, signal light emitted from the remote controller 27 strikes the light receiving unit 25. If the vertex T of the light receiving unit 25 faces the remote controller 27, the four light receiving surfaces A, B, C, and D become identical with each other in the amount of incident light of the signal light. However, if the vertex T of the light receiving unit 25 does not face the remote controller 27, the four light receiving surfaces A, B, C, and D do not become identical with each other in the amount of incident light of the signal light. Therefore, the direction of the remote controller 27 is calculated by comparing outputs emitted from the four light receiving surfaces A, B, C, and D by use of a control means not shown, and the telescope 12 is turned toward the remote controller 27. When the collimation axis O of the telescope 12 is directed toward the remote controller 27, i.e., toward the reflecting prism 23, an LED 31 mounted on the front of the surveying instrument 11 is lit, and the operator is informed of this. Hereafter, the telescope 12 automatically collimates the direction of the reflecting prism 23 by means of an automatic collimation device not shown.

In this surveying instrument, the direction of the reflecting prism 23 is swiftly found by the light receiving units 25 and 26 prior to automatic collimation. Therefore the reflecting prism 23 does not need to be searched while performing a scanning operation of a wide range with the telescope 12 having a narrow visual field, and hence time taken until the collimation completion of the reflecting prism 23 is shortened, and the survey can be smoothly performed.

SUMMARY OF THE INVENTION

However, in the surveying instrument 11 disclosed in Japanese Patent No. 3075384 mentioned above, if reflective objects, such as windowpanes, exist behind the surveying instrument, a case will occur in which signal light (guide light) emitted from the remote controller 27 is reflected by the reflective objects, and is then caused to impinge on the light receiving unit 26 mounted on the back thereof In this case, the surveying instrument 11 regards the reflecting prism 23 as being placed in the direction of the reflective objects, and the telescope 12 of the surveying instrument 11 cannot be directed toward the reflecting prism 23. Therefore, disadvantageously, cases may arise in which a malfunction occurs in collimation preparation prior to the start of automatic collimation, and the automatic collimation cannot be performed.

The present invention has been made in consideration of the above-mentioned problem, and it is an object of the present invention to provide a survey system in which guide light is emitted from the side of a target, and, on the side of a surveying instrument, a telescope is directed roughly toward the target by receiving the guide light so that time required to perform automatic collimation can be shortened, wherein the automatic collimation can be reliably performed by removing guide light reflected by reflective objects such as windowpanes.

In order to achieve the object, the invention is characterized in that a survey system comprises a target for collimation and a surveying instrument provided with an automatic collimation device that causes a collimation axis of a telescope to automatically coincide with the target, and the survey system is characterized by a target with a guide light transmitter that emits guide light, the surveying instrument including a direction detector that detects a direction of the guide light transmitter by receiving the guide light and a collimation preparing means for directing the telescope toward the target based on an output signal emitted from the direction detector before actuating the automatic collimation device, the guide light transmitter emitting circularly polarized guide light, the direction detector including a polarization changing portion for changing the circularly polarized guide light into linearly polarized guide light and a polarizing plate for giving a polarization plane that coincides with the linearly polarized guide light into which the circularly polarized guide light has been changed by the polarization changing portion.

The invention is further characterized in that the guide light transmitter includes a light emitting portion that emits linearly polarized light and a polarization changing portion by which linearly polarized light emitted from the light emitting portion is changed into circularly polarized guide light.

The invention is further characterized in that the light emitting portion comprises a light source and a polarizing plate by which light emitted from the light source is changed into linearly polarized light, and each of the polarization changing portions, by which the circularly polarized guide light is changed into linearly polarized light, and the polarization changing portion, by which linearly polarized light is changed into circularly polarized guide light, is a quarter-wave plate.

The invention is further characterized in that the guide light transmitter includes a circularly polarized light semiconductor laser.

BRIEF DESCRIPTION OF THE DRAWINGS

FIG. 4 is a flowchart for explaining the operation of the survey system.

DETAILED DESCRIPTION OF THE INVENTION

According to the invention, when circularly polarized guide light emitted from the guide light transmitter is reflected by a reflective object existing behind the surveying instrument, the circularly polarized guide light is changed into circularly polarized reflection guide light whose rotational direction has been reversed. When guide light that directly enters the direction detector from the guide light transmitter passes through the polarization changing portion, the guide light is changed into linearly polarized light, and can pass through the polarizing plate. However, when the reflection guide light whose rotational direction has been reversed passes through the polarization changing portion, the reflection guide light is changed into linearly polarized light whose polarization plane is deviated by 90° in comparison to that obtained when the circularly polarized light having the original rotational diction passes through the polarization changing portion, so that the Linearly polarized light cannot pass through the polarizing plate. Thus, it is possible to remove a circularly polarized reflection guide light whose rotational direction has been reversed and which has been reflected by the reflective object existing behind the surveying instrument and to reliably perform automatic collimation so as not to allow a malfunction to occur during collimation preparation prior to the start of automatic collimation of the surveying instrument.

According to the invention, the guide light transmitter includes a light emitting portion that emits linearly polarized light and a polarization changing portion by which linearly polarized light emitted from the light emitting portion is changed into circularly polarized guide light. Therefore, the survey system of the present invention can be easily realized at low cost.

According to the invention, the light emitting portion comprises a light source and a polarizing plate, and each polarization changing portion is a quarter-wave plate. Therefore, the survey system of the present invention can be realized more easily and at lower price.

According to the invention, the guide light transmitter includes a circularly polarized light semiconductor laser, and directly emits circularly polarized guide light. Therefore, the polarizing plate and the polarization changing portion are not needed, and an extremely simple mechanism can be structured at low cost. Therefore, a lower-cost survey system can be realized.

BEST MODE FOR CARRYING OUT THE INVENTION

A detailed description will be hereinafter given of a mode for carrying out the present invention with reference to the accompanying drawings.

Figure 1:
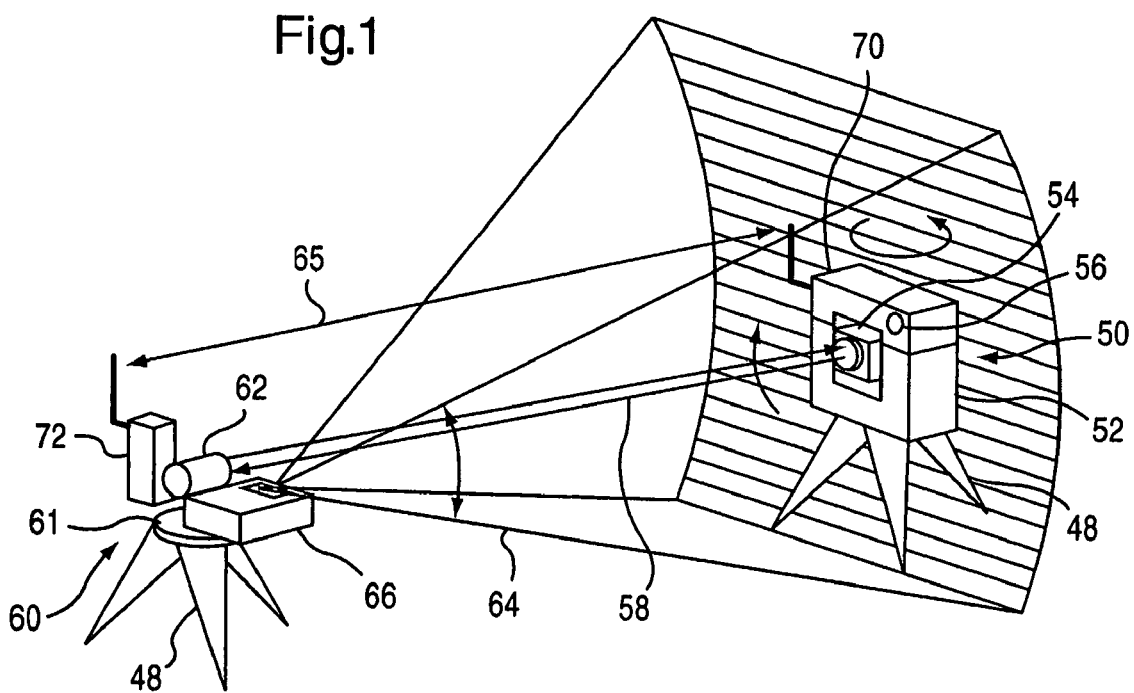
FIG. 1 is a schematic view showing a survey system according to a first embodiment of the present invention.
Figure 2:
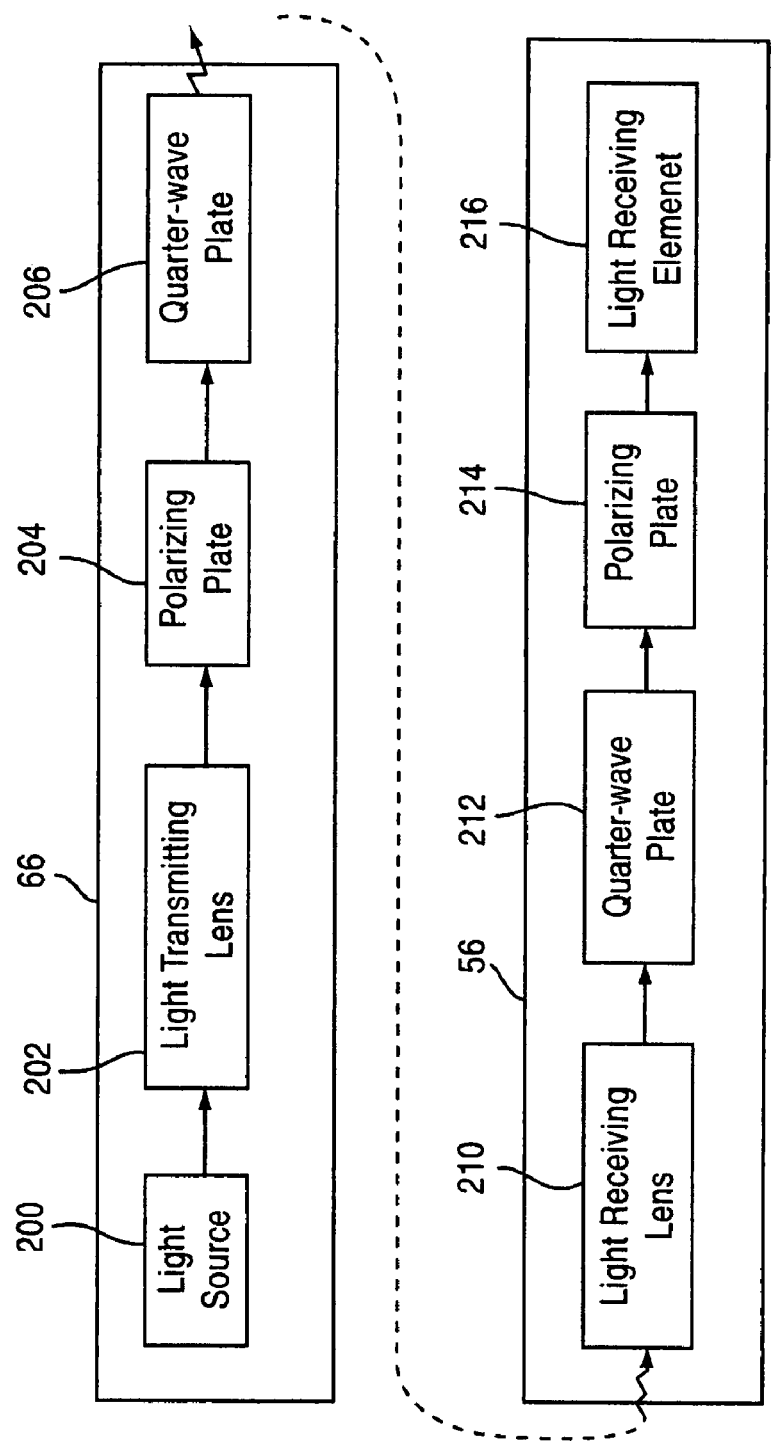
FIG. 2 is a block diagram of a guide light transmitter and a direction detector of the survey system.
Figure 3:
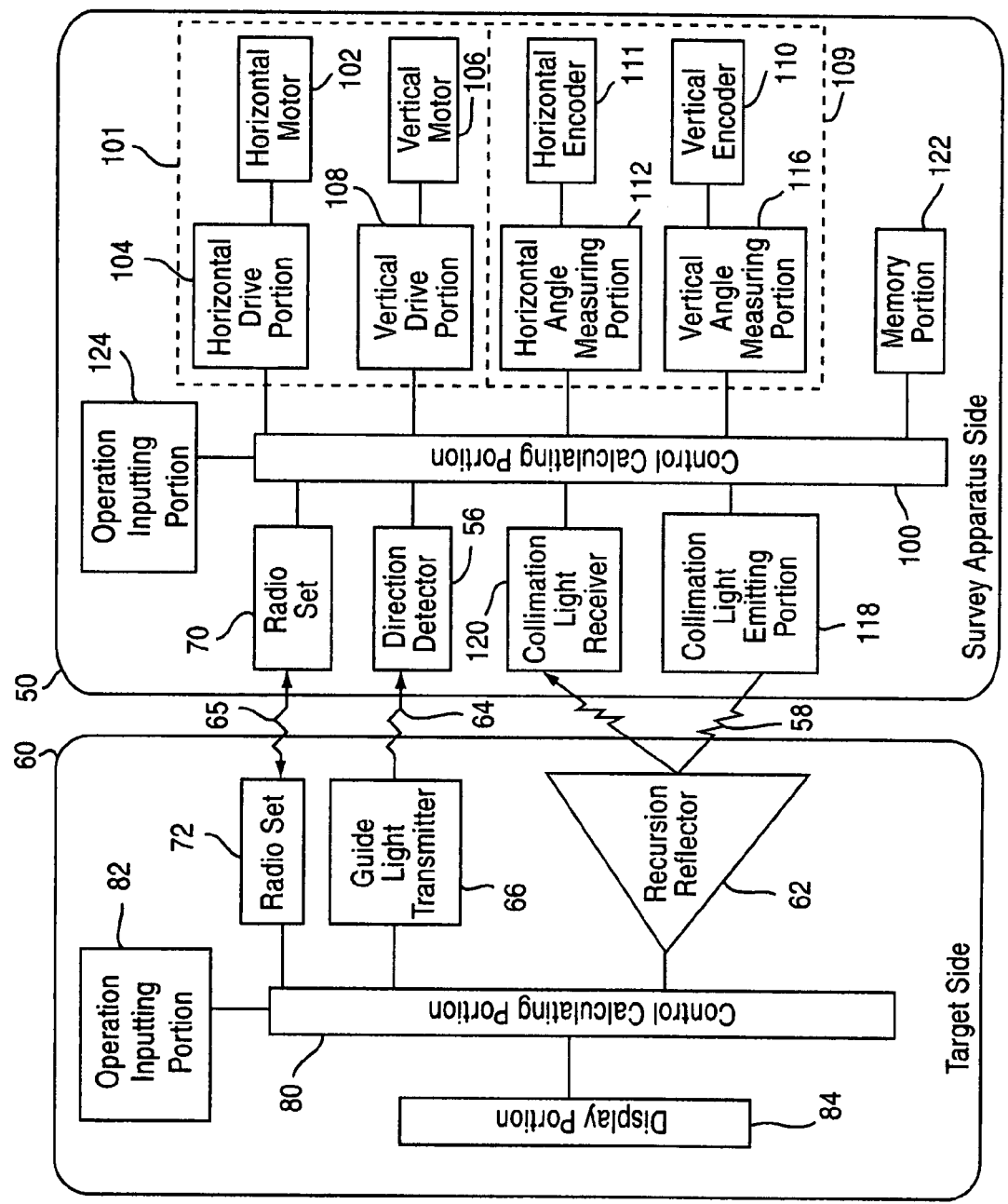
FIG. 3 is a block diagram of the whole of the survey system.

First, an embodiment of the present invention will be described with reference to FIG. 1 to FIG. 5. FIG. 1 is a schematic view of a survey system of the present invention. FIG. 2 is a block diagram showing a guide light transmitter and a direction detector that receives guide light in this survey system. FIG. 3 is a block diagram of the whole of the survey system. FIG. 4 is a flowchart for explaining the operation of the survey system. FIG. 5 is a view for explaining the effects of the present invention.

As shown in FIG. 1, the survey system of this embodiment consists of a surveying instrument 50 provided with an automatic collimation device and a target 60 provided with a retroreflector 62, such as a reflecting prism, by which light is reflected in its incident direction. The surveying instrument 50 includes an instrument body 52, which is horizontally rotatable and which is placed on a leveling plate, not shown, fixed onto a tripod 48, and a telescope 54 rotatable vertically with respect to the instrument body 52. The target 60 includes the retroreflector 62, which is placed on a leveling plate 61 fixed onto the tripod 48 and which reflects collimation light 58 emitted from the surveying instrument 50 toward the surveying instrument 50, and a guide light transmitter 66, which is placed on the leveling plate 61 and which emits guide light 64 showing the direction of the target 60 toward the surveying instrument 50. The guide light 64 is modulated so that the surveying instrument 50 can perceive light as the guide light 64. Likewise, the collimation light 58 is modulated so that the surveying instrument 50 can perceive light as the collimation light 58.

As shown in FIG. 2(A), the guide light transmitter 66 is made up of a light source 200 (e.g., a laser diode), a light transmitting lens 202 that is a cylindrical lens by which light emitted from the light source 200 is changed into a broad fan beam (fan-shaped beam) that is narrow in the vertical direction and that is expansive in the horizontal direction, a polarizing plate 204 by which light that has passed through the light transmitting lens 202 is changed into linearly polarized light, and a quarter-wave plate 206 by which this linearly polarized light is changed into circularly polarized guide light 64. The guide light transmitter 66 swings in the vertical direction, so that the guide light 64 is used for a scanning operation in the vertical direction. Of course, it is permissible that the guide light transmitter 66 uses a convex lens as the light transmitting lens instead of the cylindrical lens and that a beam of light emitted from the light source 200 is condensed by the convex lens and is changed into a diffusible guide light that is conically spread so that the scanning operation is not performed with this guide light.

The main body 52 of the surveying instrument 50 has a direction detector 56 that detects the direction of the guide light 64 emitted from the guide light transmitter 66. Since the guide light 64 is used for a scanning operation in the vertical direction, the direction detector 66 is designed to be able to detect the direction of the guide light transmitter 66 even if there is a large level difference between the surveying instrument 50 and the target 60. If the surveying instrument 50 is near in place to the target 60, and there is a large vertical interval therebetween, a case may occur in which the direction detector 56 is located outside a scanning range of the guide light 64. Therefore, the scanning range of the guide light transmitter 66 is designed to be able to shift both upwards and downwards step by step in the such a case.

As shown in FIG. 2(B), the direction detector 56 is made up of a light receiving lens 210 that is a cylindrical lens used to condense the circularly polarized guide light 64, a quarter-wave plate 212 by which the guide light 64 condensed by the light receiving lens 210 is changed firm circularly polarized light into linearly polarized light, a polarizing plate 214 that gives a polarization plane that coincides with a polarization plane obtained when the guide light 64a that has directly fallen on is changed into lineally polarized light LP by means of the quarter-wave plate 212 so as to allow only the guide light 64 that has directly fallen thereon from the guide light transmitter 66 to pass therethrough, and a rectangular light-receiving element 216 that receives the guide light 64 that has passed through the polar plate 214. A toric lens or a convex lens may be used as the light receiving lens 210 instead of the cylindrical lens. The tonic lens is a lens formed by arcuately bending the cylindrical lens. A slit, not shown, by which a horizontal light receiving range is limited is provided along the vertical direction in front of the light receiving lens 210. The direction detector 56 is fixed to the instrument body 52 and detects the horizontal direction of the guide light transmitter 66 by dirty receiving the guide light or by receiving the guide light 64 when the instrument body 52 is horizontally rotated.

The surveying instrument 50 and the target 60 are provided with radios 70 and 72, respectively, that are used to exchange command signals, survey results, etc., with each other via radio waves 65 Each of the radios 70 and 72 has a non-directional antenna and can carry out communications via radio waves 65 so that communications can be exchanged therebetween oven when the surveying instrument 50 and the target 60 do not exactly face each other.

Next, with reference to the block diagram of FIG. 3, a description will be given of an internal structure of the surveying instrument 50 and an internal structure of the target 60 that constitute the survey system.

The surveying instrument 50 includes a drive portion 101 for directing the telescope 54 toward the target 60, a measuring portion 109 for measuring a horizontal angle and a vertical angle of the telescope 54, a collimation light emitting portion 118 for emitting collimation light 58 toward the target 60, a collimation light receiver 120 for receiving the collimation light 58 reflected from the target 60, a memory portion 122 for storing data such as measured angle values, and a central processing unit (CPU) 100 connected to the drive portion 101, to the collimation light emitting portion 118, to the measuring portion 109, to the collimation light receiver 120, and to the memory portion 122. Various commands and data can also be input from an operating/inputting portion 124 to the central processing unit 100.

The drive portion 101 is made up of a horizontal motor 102 that horizontally rotates the instrument body 52, a vertical motor 106 that vertically rotates the telescope 54, and a horizontal drive portion 104 and a vertical drive portion 108 for supplying a driving current to the motors 102 and 106, respectively. The measuring portion 109 is made up of a horizontal encoder 111 that is horizontally rotated of the instrument body 52, a vertical encoder 110 that is vertically rotated together with the telescope 54, a horizontal angle measuring portion 112 and a vertical angle measuring portion 116 that read rotation angles of the encoders 111 and 110, respectively, and a distance measuring portion not shown.

The surveying instrument 50 includes an automatic collimation device by which the optical axis (collimation axis) of the telescope 54 is automatically directed toward the target 60. The automatic collimation device is made up of the central processing unit 100, the collimation light emitting portion 118, the collimation light receiver 120, and the drive portion 101. The automatic collimation device is to allow the central processing unit 100 to determine the direction of the target 60 by emitting the collimation Light 58 from the collimation light emitting portion 118 and by receiving the collimation Light 58, which has been reflected from the target 60 and has returned, by means of the collimation light receiver 120 and is to control the drive portion 101 so that the optical axis of the telescope 54 can turn to the target 60.

Since the electronic distance meter of the surveying instrument 50 described above is the same as a conventional total station provided with an automatic collimation device, overlapping description is omitted.

The surveying instrument 50 of this embodiment additionally includes a collimation preparing means for directing beforehand the telescope 54 toward the target 60 before actuating the automatic collimation device. The collimation preparing means of this embodiment is made up of the direction detector 56, the radio 70, the drive portion 101, and the central processing unit 100 connected to these elements. The collimation preparing means is to direct the telescope 54 toward the guide Light transmitter 66 based on an output signal emitted from the direction detector 56 and is to actuate the automatic collimation device when the telescope 54 is regarded as having been directed substantially toward the target 60.

On the other hand, the target 60 of this embodiment includes a central processing unit 80 connected to the guide light transmitter 66 and to the radio 72, besides the retroreflector 62, the guide light transmitter 66, and the radio 72. An operating/inputting portion 82 for inputting various commands and data and a display portion 84 for displaying a state of the target 60 and a state of the surveying instrument 50 are additionally connected to the central processing unit 80.

Next, the operation of the survey system of this embodiment will be described with reference to the flowchart of FIG. 4.

When the survey system of this embodiment is started, the process proceeds to step S1, where the target 60 emits guide light 64 from the guide light transmitter 66. Thereafter, the process proceeds to step S2, where the target 60 emits a horizontal rotation command signal, by which the instrument body 52 is horizontally rotated, to the surveying instrument 50. Thereupon, the surveying instrument 50 receives the horizontal rotation command signal in step S101, and then the process proceeds to step S102, where a notice to star a horizontal rotation is transmitted to the target

60. The target 60 ascertains the horizontal rotation of the instrument body 52 in step S3, and hence perceives that the surveying instrument 50 has started a horizontal search for the guide light transmitter 66.

The process proceeds to step S103, where the surveying instant 50 horizontally rotates the instrument body 52. Thereafter, the process to step S104, where the guide Light 64 is received, and the horizontal direction of the guide light transmitter 66 is detected. If the guide light 64 cannot be received in a predetermined time here, the process proceeds to step S105, where an error notice is transmitted to the target 60. On the side of the target 60, after the error notice is confirmed in step S4, the process proceeds to step S5, where a horizontal detection error is displayed on the display portion 84, and the operation is stopped.

If the guide light 64 is received in step S104, the process proceeds to step S106, where the horizontal position of the telescope 54 is adjusted toward the guide light transmitter 66, and the horizontal rotation of the instrument body 52 is stopped. Thereafter, the process proceeds to step S107, where a guide Light OFF command is emitted to the target 60. When the guide light OFF command is received in step S6, the target 60 perceives that the horizontal search of the guide light transmitter 66 has been completed in the surveying instrument 50, and hence the process proceeds to step S7, where the guide light 64 is turned off. Thereafter, the process proceeds to step S8, where the guide light OFF notice is transmitted to the surveying instrument 50.

If the surveying instrument 50 confirms the guide light OFF notice in step S108, the process proceeds to step S109, where collimation light 58 is emitted Thereafter, the process proceeds to step S110, where the notice that the telescope 54 has started a vertical rotation is transmitted to the target 60. The vertical rotation notice is confirmed in step S9, and hence the target 60 perceives that the surveying instrument 50 has started a vertical search for the target 60. On the other hand, on the side of the surveying instrument, the process proceeds to step S111, where the telescope 54 is vertically rotated, and the vertical search for the target 60 is continued.

Thereafter, the process proceeds to step S112, where the surveying instrument 50 detects the vertical direction of the target 60 by emitting collimation light 58 and by receiving the collimation light 58 that has been reflected by the target 60 and has returned. If the collimation light 58 cannot be received here, the process returns to step S101, where a flow procedure is repeated, or the process p to step S113, where an error notice is transmitted to the target 60. On the side of the target 60, if the error notice is confirmed in step S10, the process proceeds to step S11, where a vertical direction detecting error is displayed on the display portion 84, and the operation is stopped.

If the collimation light 58 is received in step S112, the process proceeds to step S114, where the telescope 54 is aligned with the vertical position of the target 60, and the telescope 54 is stopped. Thereafter, the process proceeds to step S115, where a collimating operation is started, and a notice to the effect that a collimating operation is being operated is transmitted to the target 60. The target 60 confirms that a collimating operation is being operated in step S12, and perceives that the automatic collimation device has been actuated in the surveying instrument 50. On the other hand, on the side of the surveying instrument 50, the process proceeds to step S116, where the automatic collimating operation is continued.

If the collimation operation is unsatisfactorily performed instep S116, the process runs to step S110, where the flow procedure is repeated, or the process proceeds to step S117, where an error notice is transmitted to the target 60. On the side of the target 60, if the error notice is confirmed in step S13, the process proceeds to step S14, where a collimation error is displayed on the display portion 84, and the operation is stopped. If the collimation operation is satisfactorily performed in step S116, the process proceeds to step S118, where a collimation completion notice is transmitted to the target 60. Accordingly, the target 60 perceives that the automatic collimation has been completed in the surveying instrument 50 in step S15.

Thereafter, the process proceeds to step S119, where the surveying instrument 50 measures a distance and an angle. Thereafter, the process proceeds to step S120, white a measured distance value and a measured angle value are transmitted to the target 60. On the side of the target 60, if the measured distance value and the measured angle value are confirmed in step S16, survey results, such as the measured distance value and the measured angle value, are displayed on the display portion 84, and the survey is ended.

When this survey system is stopped by an error, it is recommended to remove the cause of the error and then restart the operation of the survey system.

Figure 5A:
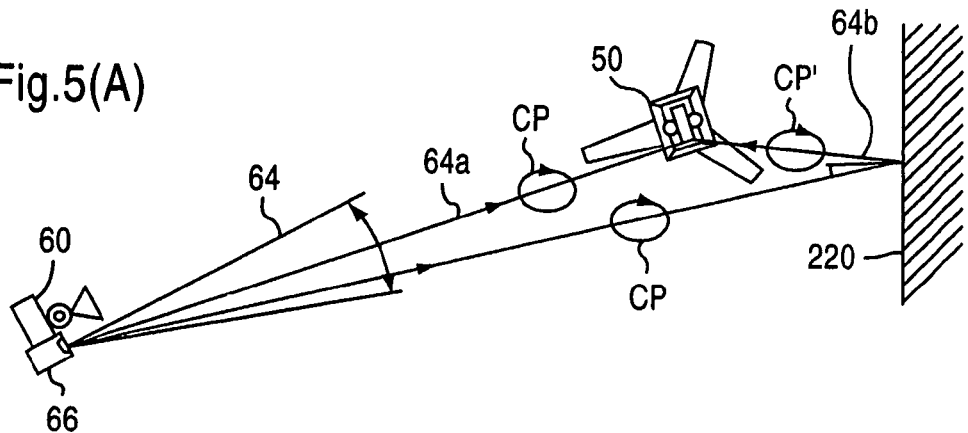
FIG. 5 is a view for explaining effects of the survey system.
Figure 5B:
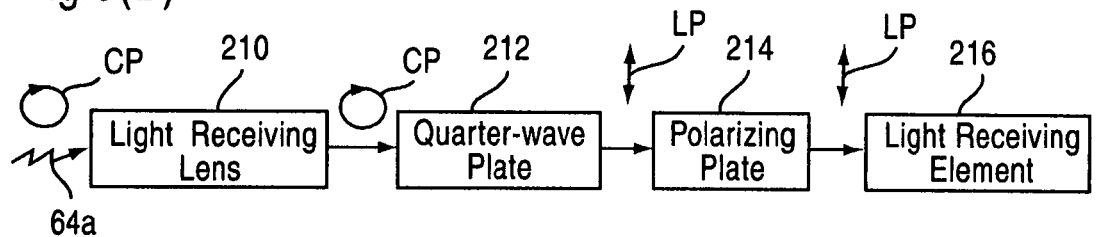

Next, a description will be given of effects achieved by the present embodiment. As shown in FIG. 5(A), in this embodiment, the guide light 64 emitted from the guide light transmitter 66 is circularly polarized light CP. Guide light 64*a*, which is part of his guide Light 64 and which directly falls on the direction detector 56, is changed into linearly polarized light LP by passing though the quarter-wave plate 212 as shown in FIG. 5(B), then passes through the polarizing plate 214 that gives a polarization plane that can transmit only this linearly polarized light LP, and falls on the light-receiving element 216.

Figure 5C:
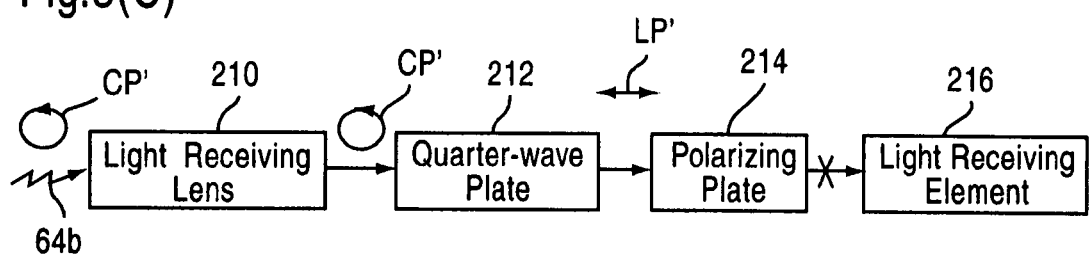

On the other lad, when the guide light 64 is reflected by a reflective object 220, such as a piece of glass, behind the surveying instrument 50 and is changed into reflection guide light 64*b* as shown in FIG. 5(A), the rotational direction of circularly polarize light CP' is reversed. When the circularly polarized light CP' 0 whose rotational direction has been reversed in this way enters the quarter-wave plate 212 as shown in FIG. 5(C), the circularly polarized light CP' is changed into linearly polarized light LP' having a polarization plane perpendicular to a polarization plane appearing after the guide light 64*a* that directly arrives from the guide light transmitter 66 and passes through the quarter-wave plate 212, and hence cannot pass through the polarizing plate 214. If the guide light 64 falls on the reflective object 220 at some incident angle without perpendicularly falling thereon at this time, the reflection guide light 64*b* is changed into elliptically polarized light not into circularly polarized light. Therefore, part of the reflection guide light 64*b* passes through the polarizing plate 214, but in practical use, the reflection guide light 64*b* can be satisfactorily removed by the polarizing plate 214 even if the incident angle of the guide light 64 on the reflective object 220 becomes equal to a few tens of degrees. Therefore, in this embodiment, it is also possible to remove the reflection guide light 64*b* reflected from the reflective object 220, such as a windowpane, placed at the side of the surveying instrument 50 and the target 60.

When the guide light 64 emitted from the guide light transmitter 66 directly falls on the direction detector 56 in this way, the light-receiving element 216 can receive the guide light 64, but, when the guide light 64 falls on the direction detector 56 after having been reflected by the reflective object 220 such as a piece of glass, the light-receiving element 216 does not receive the guide light 64.

Therefore, in this surveying instrument 50, a case does not occur in which the direction of the target 60 is incorrectly recognized by receiving the guide light 64 reflected by the reflective object 220 such as a piece of glass.

Additionally, in this embodiment, since the guide light 64 is a fan beam that is horizontally wide and that is vertically narrow, the guide light 64 can be caused to reach a distant point with small electric power, and, since the guide light 64 is projected in a wide range in all directions while performing a vertical scanning operation with the guide light 64, the direction detector 56 provided in the surveying instrument 50 can reliably receive the guide light 64, and collimation preparation for directing beforehand the telescope 54 substantially toward the target 60 before starting the automatic collimation can be reliably performed even if there is a large vertical interval between the surveying instrument 50 and the target 60 and even if the surveying instrument 50 and the target 60 do not exactly face each other.

Figure 6:
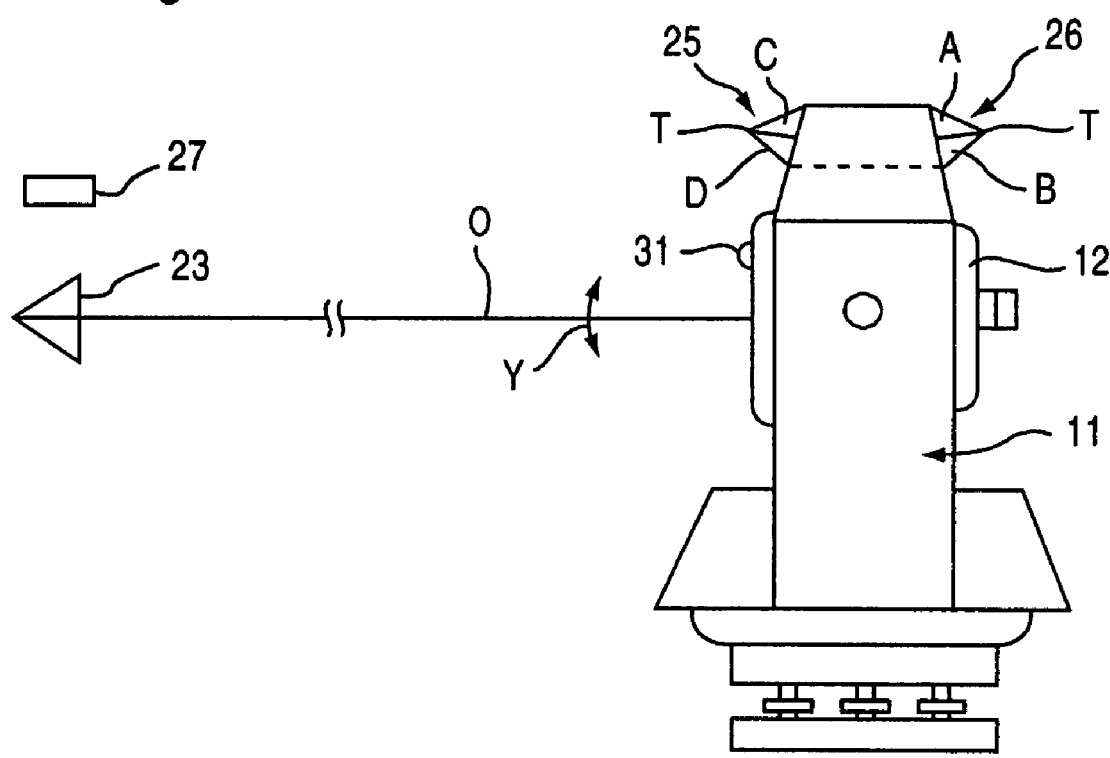
FIG. 6 is a view showing a conventional surveying instrument provided with a remote controller.
Figure 7:
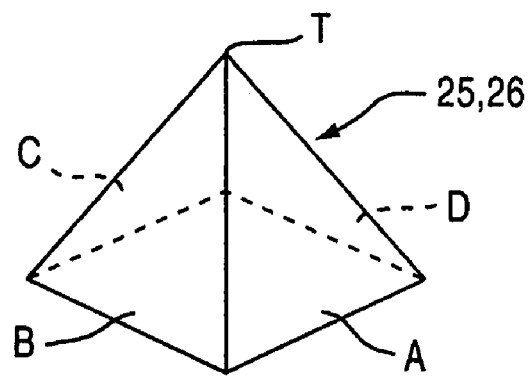
FIG. 7 is a perspective view of a light receiving unit mounted in the conventional surveying instrument.

Without being limited to the above-mentioned embodiment, the present invention can be variously modified. For example, in the above-mentioned embodiment, the guide light 64, which is a fan beam is emitted from the guide light transmitter 66 while being moved upwards and downwards for scanning, and the direction of the guide light transmitter 66 is detected by horizontally rotating the instrument body 52. However, the structure of the guide light transmitter 66 and the structure of the direction detector 56 shown in FIG. 2 can be applied to the conventional remote controller 27 and to the conventional light receiving units 25 and 26 shown in FIG. 6 and FIG. 7.

Additionally, in the guide light transmitter 66 of the above-mentioned embodiment, light emitted from the light source 200 is changed into linearly polarized light by means of the polarizing plate 204. However, since a laser diode emits linearly polarized light, the polarizing plate 204 can be omitted If the guide light transmitter 66 has a light emitting portion that emits linearly polarized light in this way, the polarizing plate 204 can be omitted Alternatively, a circularly-polarized-light semiconductor laser that emits circularly polarized light (see Japanese Published Unexamined Patent Application No. 2003-273471) can be used as the light source 200. The use of the circularly-polarized-light semiconductor laser makes it possible to omit the polarizing plate 204 and the quarter-wave plate 206, and hence makes it possible to construct the guide light transmitter 66 so as to have an extremely simple structure. Additionally, in the guide light transmitter 66 of the above-mentioned embodiment, linearly polarized light is changed into circularly polarized light by means of the quarter-wave plate 206. However, an appropriate polarization changing portion that changes linearly polarized light into circularly polarized light can be used instead of the quarter-wave plate 206. In any case what is required of the guide light transmitter 66 is to emit the circularly polarized guide light 64.

Additionally, in the direction detector 56 of the above-mentioned embodiment, circularly polarized light is changed into linearly polarized light by means of the quarter-wave plate 214. However, an appropriate polarization changing portion that changes circularly polarized light into linearly polarized light can be used instead of the quarter-wave plate 214.

The invention claimed is:

1. A survey system comprising a target for collimation and a surveying instrument provided with an automatic collimation device that causes a collimation axis of a telescope to automatically coincide with the target, wherein
said target has a guide light transmitter that emits guide light,
said surveying instrument including a direction detector that detects a direction of said guide light transmitter by receiving the guide light and a collimation preparing means for directing said telescope toward said target based on an output signal emitted from said direction detector before actuating said automatic collimation device,
said guide light transmitter emitting circularly polarized guide light,
said direction detector including a polarization changing portion for changing said circularly polarized guide light into linearly polarized guide light and a polarizing plate for giving a polarization plane that coincides with said linearly polarized guide light into which said circularly polarized guide light has been changed by said polarization changing portion.

2. A survey system as recited in claim 1, wherein said guide light transmitter includes a light emitting portion that emits linearly polarized light and a polarization changing portion by which linearly polarized light emitted from said light emitting portion is changed into circularly polarized guide light.

3. A survey system as recited in claim 2, wherein said light emitting portion comprises a light source and a polarizing plate by which light emitted from said light source is changed into linearly polarized light, and each of said polarization changing portion by which said circularly polarized guide light is changed into linearly polarized light and said polarization changing portion by which linearly polarized light is changed into circularly polarized guide light is a quarter-wave plate.

4. A survey system as recited in claim 1, wherein said guide light transmitter includes a circularly polarized light semiconductor laser.

* * * * *